United States Patent [19]

Aho

[11] Patent Number: 4,799,137
[45] Date of Patent: Jan. 17, 1989

[54] REFLECTIVE FILM

[75] Inventor: Kenneth A. Aho, Chisago City, Minn.

[73] Assignee: Minnesota Mining and Manufacturing Company, St. Paul, Minn.

[21] Appl. No.: 30,033

[22] Filed: Mar. 24, 1987

[51] Int. Cl.$^4$ ............................................. F21V 13/04
[52] U.S. Cl. .................................... 362/309; 362/327; 362/339; 428/912.2; 350/286
[58] Field of Search ............... 362/299, 301, 303, 304, 362/309, 327, 347, 348, 349, 339, 31, 255, 256; 350/286; 428/912.2, 167, 30, 458, 913

[56] References Cited

U.S. PATENT DOCUMENTS

| | | | |
|---|---|---|---|
| 1,610,423 | 12/1926 | Cawley | 362/327 |
| 2,086,388 | 7/1937 | Nechin | 362/327 |
| 2,096,453 | 10/1937 | Exelmans | 362/308 |
| 3,049,616 | 8/1962 | Davis | 362/339 |
| 4,652,979 | 3/1987 | Arima | 362/309 |
| 4,654,761 | 3/1987 | Walsh | 362/308 |

FOREIGN PATENT DOCUMENTS

| | | | |
|---|---|---|---|
| 53-8880 | 1/1978 | Japan | 362/301 |
| 531185 | 12/1940 | United Kingdom | 362/309 |
| 1021159 | 12/1964 | United Kingdom | 362/309 |

*Primary Examiner*—Ira S. Lazarus
*Assistant Examiner*—Sue Hagarman
*Attorney, Agent, or Firm*—Donald M. Sell; Stephen W. Buckingham

[57] ABSTRACT

A light transmissive film having a smooth surface and a structured surface. The structured surface has a series of triangular prisms running parallel or concentric to one another. A reflector is placed adjacent to the smooth surface so that light entering the film at an angle which is close to parallel to the smooth surface will emerge from the film at a predetermined angle with respect to the incoming beam. A light fixture utilizing the film is also disclosed.

13 Claims, 2 Drawing Sheets

REFLECTIVE FILM

The present invention relates to optical films and more particularly to an optical film which will reflect light at a predetermined constant angle relative to the angle of incidence.

BACKGROUND OF THE INVENTION

In many situations a light source is desired to provide a colliminated beam of light. The typical method of providing such a colliminated beam of light is to utilize a parabolic reflector. Two disadvantages exist in the use of parabolic reflectors, however. One disadvantage relates to the size of a parabolic reflector. If the light source is to have a large aperture, a parabolic reflector must be relatively deep, and thus enclose a large volume. This is particularly true if the parabolic reflector has a relatively short focal length. In situations where space is limited, such as automobile taillights, the size of such reflectors can be a significant disadvantage.

A second disadvantage lies in the existence of "hot" spots in the light pattern produced by a parabolic reflector. Such hot spots arise from the fact that the parabolic reflector is more efficient at gathering light near the center than at the edges. A parabolic reflector, thus, is not optimum for use in a light source where a uniform intensity is desired.

One alternative to the use of a parabolic reflector is shown in my copending application U.S. Ser. No. 016,858, filed Feb. 20, 1987, commonly assigned herewith In the approach shown in that application a reflector has fresnel structures which cause the reflector to have the properties of a parabolic reflector when it is formed into the shape of a cone. That approach allows a reflector to be less deep than the equivalent conventional parabolic reflector, but does not solve the problem of providing a uniform intensity over the entire light source.

SUMMARY OF THE INVENTION

In the present invention a light transmissive film has a structured surface and a smooth surface. The structured surface has a series of triangular prisms running parallel or concentric with to one another. A reflector is placed adjacent to the smooth surface. In a preferred embodiment a reflective coating is applied to the smooth surface.

When light enters the structured surface of the film from an angle which is close to parallel to the planar surface, the light will be totally internally reflected from the second side of the prism through which the light enters to the smooth surface. At the smooth surface it will be reflected by the reflective coating and will emerge from the structured surface at a predetermined constant angle with respect to the incoming light beam. By controlling the shape of the prisms and the thickness of the film, the direction at which the light emerges with respect to the incoming beam may be controlled. In a preferred embodiment the light is controlled to emerge nearly perpendicular to the incoming beam.

The invention may be incorporated into a lighting element by illuminating a film according to the present invention with a light source which is directed to cast light onto the film from a very narrow angle with respect to the smooth surface. The film will then reflect the light in a direction approximately perpendicular to the incoming beam. Thus the film may be used to provide a lighting element with output which is more uniform than may be obtained with other light fixtures.

DETAILED DESCRIPTION OF THE PREFERRED EMBODIMENTS

Figure 1:
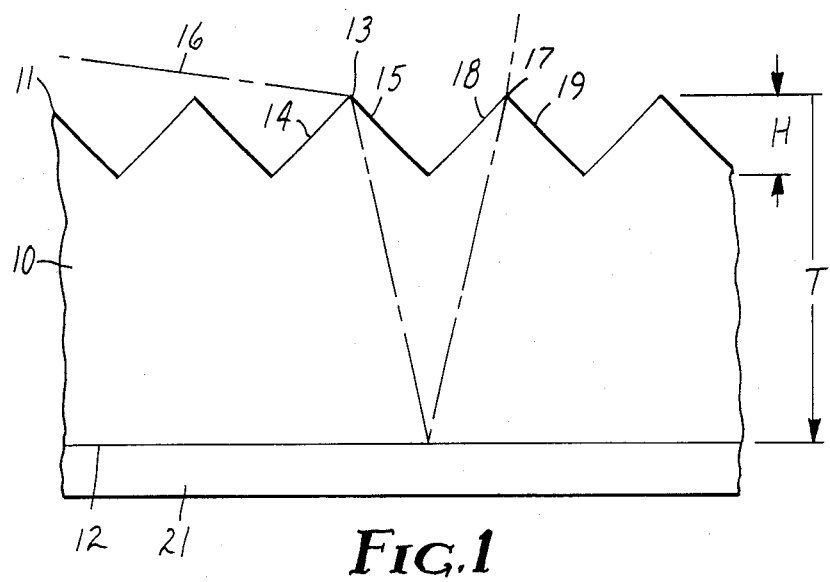
FIG. 1 is a schematic view of a film of the invention and a light ray entering the film near the top of one of the triangular prisms.

FIG. 1 shows a transparent film having a structured surface 11 and a smooth surface 12. Smooth surface 12 is equipped with a light reflective means 21. In the preferred embodiment reflector 21 is a vacuum deposited layer of aluminum.

Structured surface 11 has a plurality of triangular prisms such as prism 13. Prism 13 has sides 14 and 15. In the preferred embodiment, sides 14 and 15 meet at a right angle and, if projected to surface 12, would meet that surface at 45° angles. Thus, in the preferred embodiment the cross sections of the prisms form right isosceles triangles, with the right angles forming peaks and the legs forming a series of grooves, although other angles may be chosen and will provide reflections of other angles.

Prism 13 and others like it, each have a major axis which runs parallel to the peak of the prism. The axes of all the prisms on the film run parallel to one another.

Light beam 16 enters film 10 through facet 14 of prism 13 near the intersection of facets 14 and 15. Light beam 16 is refracted and then totally internally reflected off facet 15 of prism 13. After total internal reflection light beam 16 passes through film 10 and is reflected off reflector 21. It then passes through film 10 in the other direction and emerges through facet 19 of prism 17. At that time it is refracted a second time and emerges in a direction substantially perpendicular to incoming beam 16.

Figure 2:
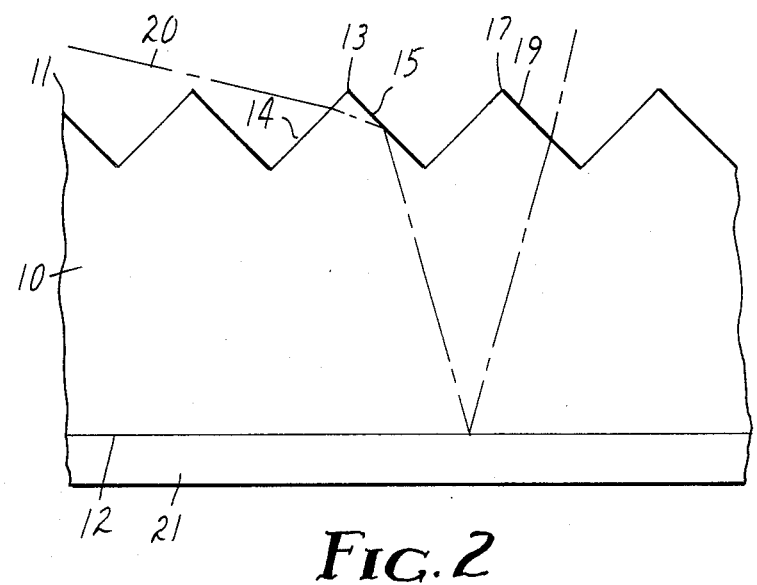
FIG. 2 is a schematic view of the film of the invention with a light ray entering towards the center of one of the triangular prisms.

FIG. 2 shows light ray 20 entering through facet 14 of prism 13 in a location more distant from the intersection of facets 14 and 15 than was the case with light ray 16 of FIG. 1. Light ray 20 is refracted upon passing through facet 14 and is totally internally reflected by facet 15. It is then reflected by reflector 21 and emerges through facet 19 of prism 17. As with light ray 16, light ray 20 is refracted upon emerging from film 10 and emerges in a direction substantially perpendicular to incoming light ray 20.

An important feature of the invention, as illustrated in FIGS. 1 and 2, relates to the fact that the outgoing light beam always emerges at a predetermined angle relative to the incoming beam. Thus, film 10 may be rotated around an axis running parallel to the axes of the prisms without affecting the direction of the outgoing light beam.

Returning to FIG. 1 the height of the prisms is designated H and the thickness of the film, i.e., the distance from surface 12 to the peaks of the prisms is designated T. In the preferred embodiment, where the light is intended to emerge in a direction perpendicular to the incoming light beam, performance has been determined to be optimized when the light beam emerges through the prism adjacent to the one through which it enters. This is accomplished when T is equal to 3.2152H. Thus if H is equal to 0.007 inches, T should be 0.225 inches. In spite of the fact that this ratio would provide optimum performance, however, films according to the invention have been found to perform adequately when deviating from this ratio.

If the direction of the incoming ray of light deviates by too great an extent from parallel to surface 12, the efficiency of the reflector will be reduced because some of the light will not strike the reflecting facet of the prism through which it enters. Assuming that the index of refraction of the film is 1.495, the index of the films used in testing the invention, the maximum angle which the incoming light ray should make with surface 12 is 13.1°, although angles of as much as 20° have produced adequate and acceptable results. Even greater angles may be used if decreased efficiencies can be tolerated in a given application.

If the angle between the incoming light and surface 12 becomes too small, efficiency will again be reduced because most of the light will enter near the peaks of the prism where small deviations from sharpness are very important. Furthermore, small deviations in the height of the prisms become more important at narrow entry angles. For this reason, angles less than 1° are not generally recommended, although theoretically possible.

As described, the film of the invention has right isosceles prisms, the sides of which each form a 45° angle with the smooth surface. The invention does not require such prisms, however. The prisms may have included angles of sizes other than 90° and need not be isosceles. If an isosceles triangle with an included angle of less than 90° is used, the film will perform similarly to the one described, but the reflected beam will emerge at an angle of less than 90°. Conversely, isosceles prisms with included angles of greater than 90° will cause the reflected beam to emerge at an angle of greater than 90° with respect to the incoming beam.

Figure 3:
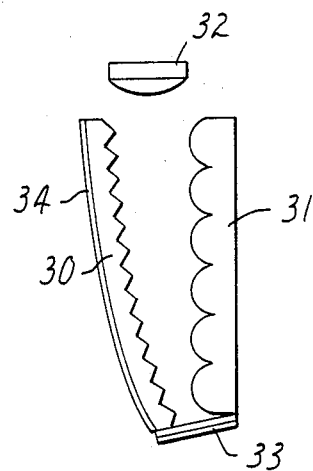
FIG. 3 is a schematic view of a lighting element utilizing the film of the invention.

FIG. 3 shows a light fixture utilizing the film of the present invention. The light fixture includes right angle reflecting film 30 with a reflector 34, a lens 31, and light source 32. Light source 32 directs a substantially collimated light at film 30 from an angle that will be within the range of angles where film 30 provides its most efficient right angle reflection. Lens 31 may be any type of lens conventionally used with light fixtures. For example, if the light fixture of FIG. 3 were to be used in an automobile taillight, lens 31 could be a conventional pillow lens which will spread the emitted light to meet established safety standards. In other types of light fixtures, other appropriate lenses may be selected. As may be seen in FIG. 3, right angle reflector film 30 is set an angle to lens 31. This is done so that the light from light source 32 can strike right angle reflector film 30 at an angle of greater than one degree and be reflected perpendicularly to lens 31.

A light fixture of the type shown in FIG. 3 will be much more compact than the conventional light fixtures utilizing conventional parabolic reflectors. This is because the light fixture of FIG. 3 need only be wide enough to accommodate light source 32. Light source 32 may also be made very compact. This is because there is no requirement that it have a large aperture like the light fixture itself. Therefore, light source 32 may utilize a compact reflector, thereby occupying little space itself. If required, more than one light source may be used.

In the preferred embodiment right angle reflecting film 30 is curved as shown in FIG. 3. This is because parabolic light sources such as light source 32 typically do not provide perfectly colimated light. Thus, the flux density of light received by right angle reflector film 30 would vary along the length, with the portion of right angle reflector film 30 which is more distant from light source 32 receiving less light, if right angle reflector 30 were flat. By providing the curvature shown, all portions of right angle reflector film 30 will receive equal flux densities and thus the light fixture will provide more uniform illumination, than would be provided if right angle reflector film 30 were flat. The exact shape of the curve will, of course, depend on the nature of light source 32. If desired, reflecting film 30 could be curved in such a manner that the resulting light fixture would appear brighter on the end more distant from light source 32.

The efficiency of the light source of FIG. 3 may be improved by including a reflector 33 at the end of the light fixture opposite light source 32. This mirror will reflect light which is emitted by light source 32 but does not strike film 30 back into film 30.

Figure 4:
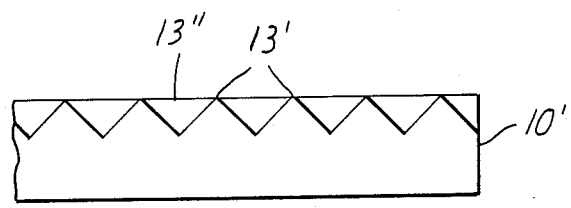
FIG. 4 is a schematic view of an alternative embodiment of the invention utilizing a round format.

FIG. 4 illustrates an alternative embodiment of the invention. In the embodiment of FIG. 4 a film 10' has a series of prisms such as prism 13'. Rather than being disposed linearly, as in the previously described embodiments, the prisms of FIG. 4 are circular and concentric. This is shown schematically by the way prism 13' curves into the location shown as 13". A light source may be located at the center of curvature of the concentric prisms. Such a light source should be directed in such a manner as to cause light to strike the film at an angle within the range of angles for which the film provides high efficiency right angle reflection.

I claim:

1. A light reflecting film formed of a transparent material, said film comprising first and second major surfaces, said first surface being a structured surface forming a plurality of triangular prisms, each of said prisms having first and second faces and said prisms forming a plurality of peaks and grooves and said second surface being second surface such that light entering one of said prisms through said prism's first face at less than a predetermined angle with respect to said second surface will be totally internally reflected by said prism's second face reflected by said light reflecting means and will emerge from said film through a different one of said prisms.

2. A light reflecting film of claim 1 wherein said light reflecting means is metal which has been deposited on said second surface.

3. The light reflecting film of claim 1 wherein said prisms are right isosceles prisms the perpendicular sides of said prisms making 45° angles with said second surface.

4. The light reflecting film of claim 3 wherein said transparent material is a polymer material.

5. The light reflecting film of claim 4 wherein said light reflecting means is metal which has been deposited on said second surface.

6. The light reflecting film of claim 1 wherein said prisms are straight and parallel to one another.

7. The light reflecting film of claim 1 wherein said prisms are circular and concentric.

8. A light fixture comprising:

a light reflecting film having first and second major surfaces, said first surface being a structured surface having a plurality of triangular prisms, each of said prisms having an axis, said axes of said prisms running parallel to one another, and said second surface being smooth, and a first light reflecting means adjacent to said second surface for reflecting light approaching said second surface from said first surface; and light emitting means on a first end of said film for illuminating said film, said light emitting means being positioned so that light rays approach said film in a direction which is almost parallel to said second surface of said film.

9. The light fixture of claim 8 wherein said light emitting means is positioned so that light rays approach said film in a direction which makes an angle of no more than 20° with said second surface.

10. The light fixture of claim 8 wherein said light emitting means is positioned so that light rays approach said film in a direction which is perpendicular to said axes of said prisms.

11. The light fixture of claim 8 further comprising a second light reflecting means on a second end of said film for reflecting light emitted by said light emitting means toward said film if said light has passed said film without striking it.

12. The light fixture of claim 11 wherein said light emitting means is positioned so that light rays approach said film in a direction which makes an angle of no more than 20° with said second surface.

13. The light fixture of claim 12 wherein said light emitting means is positioned so that light rays approach said film in a direction which is perpendicular to said axes of said prisms.

* * * * *

UNITED STATES PATENT AND TRADEMARK OFFICE
CERTIFICATE OF CORRECTION

PATENT NO. : 4,799,137

DATED : January 17, 1989

INVENTOR(S) : Kenneth A. Aho

It is certified that error appears in the above-identified patent and that said Letters Patent is hereby corrected as shown below:

Col. 1, line 11, "colliminated" should read -- collimated --.

Col. 1, line 12, "colliminated" should read -- collimated --.

Col. 1, lines 31 and 32, "herewith" should read -- herewith. --.

Col. 1, line 45, "parallel or concentric with to one another." should read -- parallel to or concentric with one another. --.

Col. 3, line 55, "is set an" should read -- is set at an --.

Col. 4, line 6, "colimated" should read -- collimated --.

Col. 4, line 45, "surface being second surface" should read -- surface being smooth, and a light reflecting means adjacent said second surface --.

Signed and Sealed this

Nineteenth Day of February, 1991

*Attest:*

HARRY F. MANBECK, JR.

*Attesting Officer*          *Commissioner of Patents and Trademarks*